(12) United States Patent
Beaudoin et al.

(10) Patent No.: US 9,458,917 B2
(45) Date of Patent: Oct. 4, 2016

(54) CONTINUOUSLY VARIABLE TRANSMISSION PROVIDED WITH A ROLLER PARKING ZONE

(75) Inventors: Samuel Beaudoin, Yamaska (CA);
Christian McMahon, Montreal (CA);
Paul Okulov, Ste-Anne-de-Bellevue (CA)

(73) Assignee: TRANSMISSION CVTCORP INC., Sainte-Julie, Québec (CA)

( * ) Notice: Subject to any disclaimer, the term of this patent is extended or adjusted under 35 U.S.C. 154(b) by 419 days.

(21) Appl. No.: 14/110,829

(22) PCT Filed: Mar. 26, 2012

(86) PCT No.: PCT/CA2012/000273
§ 371 (c)(1),
(2), (4) Date: Jan. 27, 2014

(87) PCT Pub. No.: WO2012/142694
PCT Pub. Date: Oct. 26, 2012

(65) Prior Publication Data
US 2014/0349805 A1    Nov. 27, 2014

Related U.S. Application Data

(60) Provisional application No. 61/476,508, filed on Apr. 18, 2011.

(51) Int. Cl.
F16H 15/40    (2006.01)
F16H 15/38    (2006.01)
F16H 55/34    (2006.01)
F16H 57/00    (2012.01)

(52) U.S. Cl.
CPC .............. *F16H 15/40* (2013.01); *F16H 15/38* (2013.01); *F16H 55/34* (2013.01); *F16H 2057/0093* (2013.01); *F16H 2200/00* (2013.01)

(58) Field of Classification Search
CPC ........ F16H 15/40; F16H 15/38; F16H 55/34; F16H 2057/0093; F16H 2200/00
See application file for complete search history.

(56) References Cited

U.S. PATENT DOCUMENTS

| | | | | |
|---|---|---|---|---|
| 4,322,798 A | * | 3/1982 | McCoin | F16H 15/20 476/3 |
| 5,667,456 A | * | 9/1997 | Fellows | F16H 37/021 475/214 |
| 2004/0204283 A1 | * | 10/2004 | Inoue | F16H 37/086 476/46 |
| 2014/0349805 A1 | * | 11/2014 | Beaudoin | F16H 15/38 476/42 |

FOREIGN PATENT DOCUMENTS

| | | |
|---|---|---|
| CN | 101 365 894 | 2/2009 |
| CN | 101 644 313 | 2/2010 |

* cited by examiner

*Primary Examiner* — David M Fenstermacher
(74) *Attorney, Agent, or Firm* — Fay Kaplun & Marcin, LLP

(57) ABSTRACT

Generally stated, various embodiments described herein concern a toroidal CVT provided with parking zones where the rollers are brought when the CVT is powered down. More specifically, a portion of the toroidal surfaces of the disks is reserved as a parking zone therefore preventing premature wear and/or damages to the working portion of the disks.

28 Claims, 10 Drawing Sheets

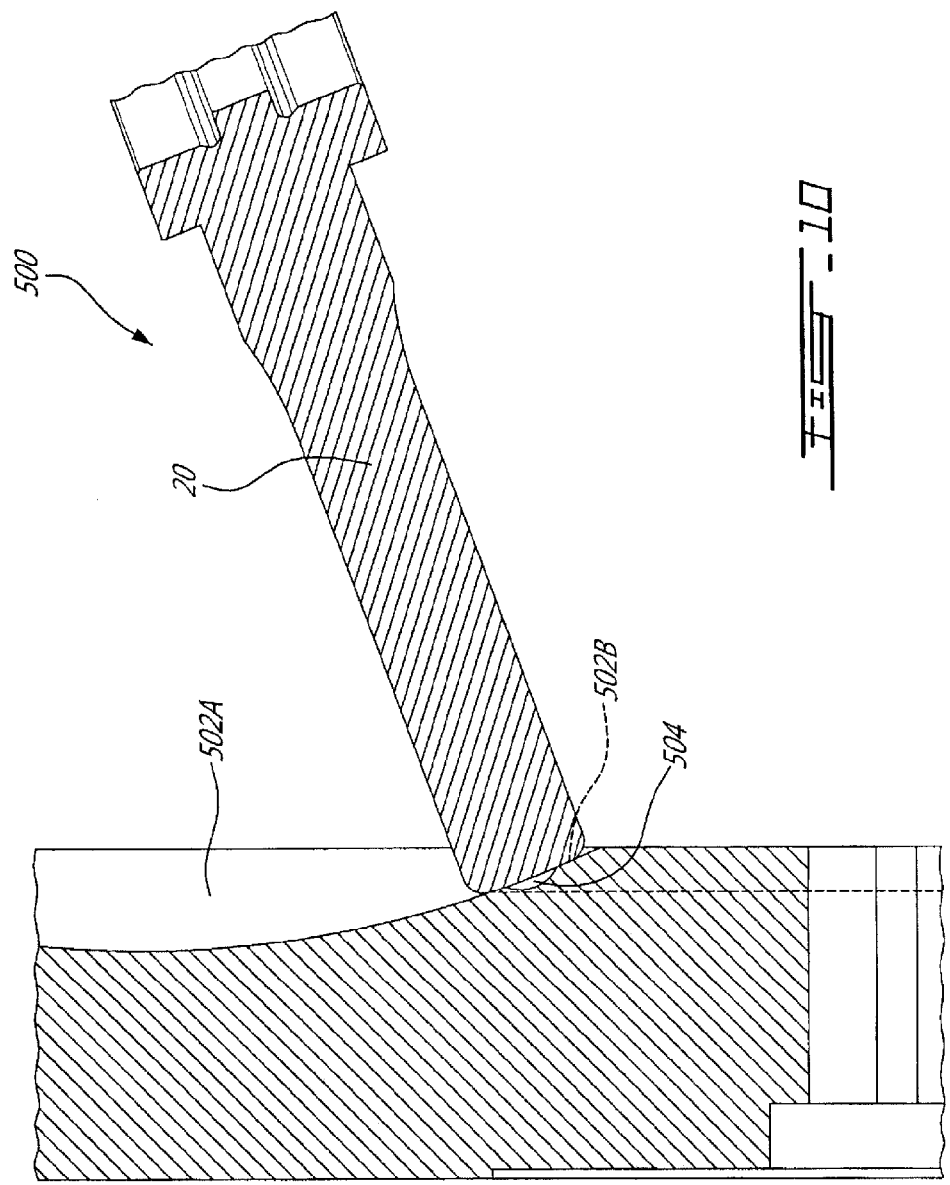

CONTINUOUSLY VARIABLE TRANSMISSION PROVIDED WITH A ROLLER PARKING ZONE

FIELD

The present invention relates to traction drive toroidal continuously variable transmissions. More specifically, the present invention is concerned with such a transmission provided with roller parking zones to prevent possible damage to the surfaces of the working zones.

BACKGROUND

Toroidal Continuously Variable Transmissions (hereinafter generically referred to as "CVT") are believed well known in the art. The operation of such a CVT will therefore only be briefly discussed herein.

Generally stated, a toroidal CVT is provided with a drive disk having a toroidal surface, a driven disk also having a toroidal surface facing the toroidal surface of the drive disk. Both disks being linked by rollers in contact with their respective toroidal surfaces. The angle of the rollers with respect to the drive and driven disks dictates the speed ratio between the driven and drive disks.

Often, toroidal CVTs are designed according to the so-called "dual cavity" configuration including two drive disks and a single driven disk having opposed toroidal surfaces and located between the two drive disks.

A clamping mechanism is conventionally used to bias the disks towards one another to therefore ensure that the rollers are adequately contacted by both the driving and the driven disks to thereby transfer torque therebetween. However, this clamping mechanism may cause premature wear of portions of the disks and rollers caused by vibrations to which the CVT may be subjected when the CVT is not in operation, for example during transport or maintenance thereof.

Indeed, while the CVT is in operation, a thin film of traction oil is present between the contacting surfaces of the rollers and disks. This film of oil is not maintained when the CVT is stopped or operated under low rotational speeds. Accordingly, when no oil film is present the metal-to-metal contact between the rollers and disks in conjunction with acting forces may cause damages in the form of scratches and other marks on both the disks and the rollers that may cause a premature wear of these surfaces. These forces may take the form of vibrations that occur during transportation (unit in a trailer while being transported over the road, railroad associated vibration or vibration occurring on a mobile application where the CVT is at rest while being moved from one site to another), when a unit is not operating but is positioned next to a vibration source such as an operating prime mover, or caused by the engine startup/shutdown torque spikes.

Generally speaking, the wear occurring during transport is going to be caused by fretting, which generates marks and scratches over the disk and roller surfaces and produces metallic debris. The metallic debris may enter the traction oil reservoir to thereby contaminate it and eventually cause more damages to be created on the rollers and disks. Furthermore, microstructural damage to the material may be caused, which is very difficult to detect.

BRIEF DESCRIPTION OF THE DRAWINGS

In the appended drawings:

FIGS. 6 and 6A are close-up views similar to FIG. 5 but illustrating a portion of a disk according to a second illustrative embodiment;

FIG. 10 is a close-up view similar to FIG. 5 but illustrating a portion of a disk according to a sixth illustrative embodiment.

DETAILED DESCRIPTION

Figure 1:
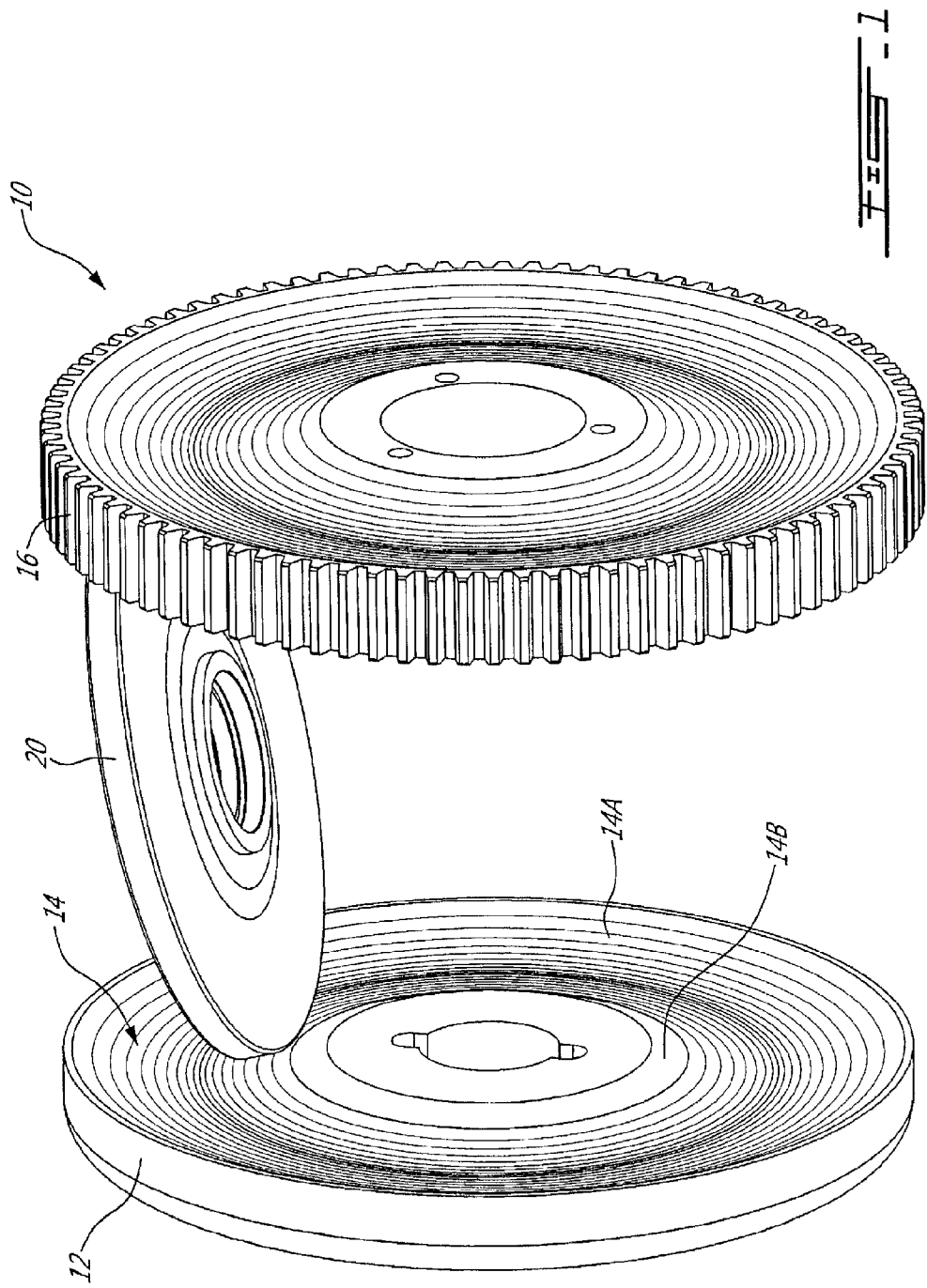
FIG. 1 is a perspective view of one of the cavity of a dual-cavity toroidal CVT according to a first illustrative embodiment.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification in the appended claims, various terminology which is directional, geometrical and/or spatial in nature such as "longitudinal", "horizontal", "front", "rear", "upwardly", "downwardly", etc. is used. It is to be understood that such terminology is used for ease of description and in a relative sense only and is not to be taken in any way as a limitation upon the scope of the present disclosure.

It is to be noted that the expression "damages", when related to the disks and rollers, is to be construed herein and in the appended claims as any scratches, marks, indentations, smearing, adhesive wear, microstructural damage, plastic deformations and the like of these surfaces.

Other objects, advantages and features of the CVT will become more apparent upon reading of the following non-restrictive description of illustrative embodiments thereof, given by way of example only with reference to the accompanying drawings.

In an illustrative embodiment, there is provided a continuously variable transmission comprising:

a first disk provided with a first toroidal surface defining a first working zone and a first parking zone;

a second disk provided with a second toroidal surface defining a second working zone and a second parking zone; the second toroidal surface facing the first toroidal surface;

at least one roller in contact with both the first and second toroidal surfaces; wherein, a) when the CVT is in operation, the at least one roller is in contact with both the first and second working zones and b) when the CVT is not in operation, the at least one roller is in contact with both the first and second parking zones.

According to another aspect, there is provided a method to prevent damages to the working zones of a toroidal CVT, the method comprising:

providing a first disk having a first toroidal surface defining a first working zone and a first parking zone;

providing a second disk having a second toroidal surface defining a second working zone and a second parking zone; the second toroidal surface facing the first toroidal surface;

providing at least one roller in contact with both the first and second toroidal surfaces;

wherein, a) when the CVT is in operation, the at least one roller is maintained in contact with both the first and second working zones and b) when the CVT is not in operation, the at least one roller is maintained contact with both the first and second parking zones.

Generally stated, various embodiments described herein concern a toroidal CVT provided with parking zones where the rollers are brought when the CVT is powered down. More specifically, a portion of the toroidal surfaces of the disks is reserved as a parking zone therefore preventing premature wear and/or damage of the working portion of the disks.

Turning now to FIGS. 1 to 5 of the appended drawings, which illustrate a portion of a dual-cavity toroidal CVT 10 according to a first illustrative embodiment. The CVT 10 includes a first disk 12 having a toroidal surface 14; a second disk 16 having a toroidal surface 18 (see FIG. 2) facing the toroidal surface 14; a plurality of rollers 20 (only one shown for clarity purpose) in contact with both toroidal surfaces 14 and 18.

As can be seen from FIG. 1, the toroidal surface 14 is virtually divided into an outer working zone 14A and an inner parking zone 14B. Similarly, FIG. 2 shows that the toroidal surface 18 is virtually divided into an inner working zone 18A and an outer parking zone 18B.

Figure 2:
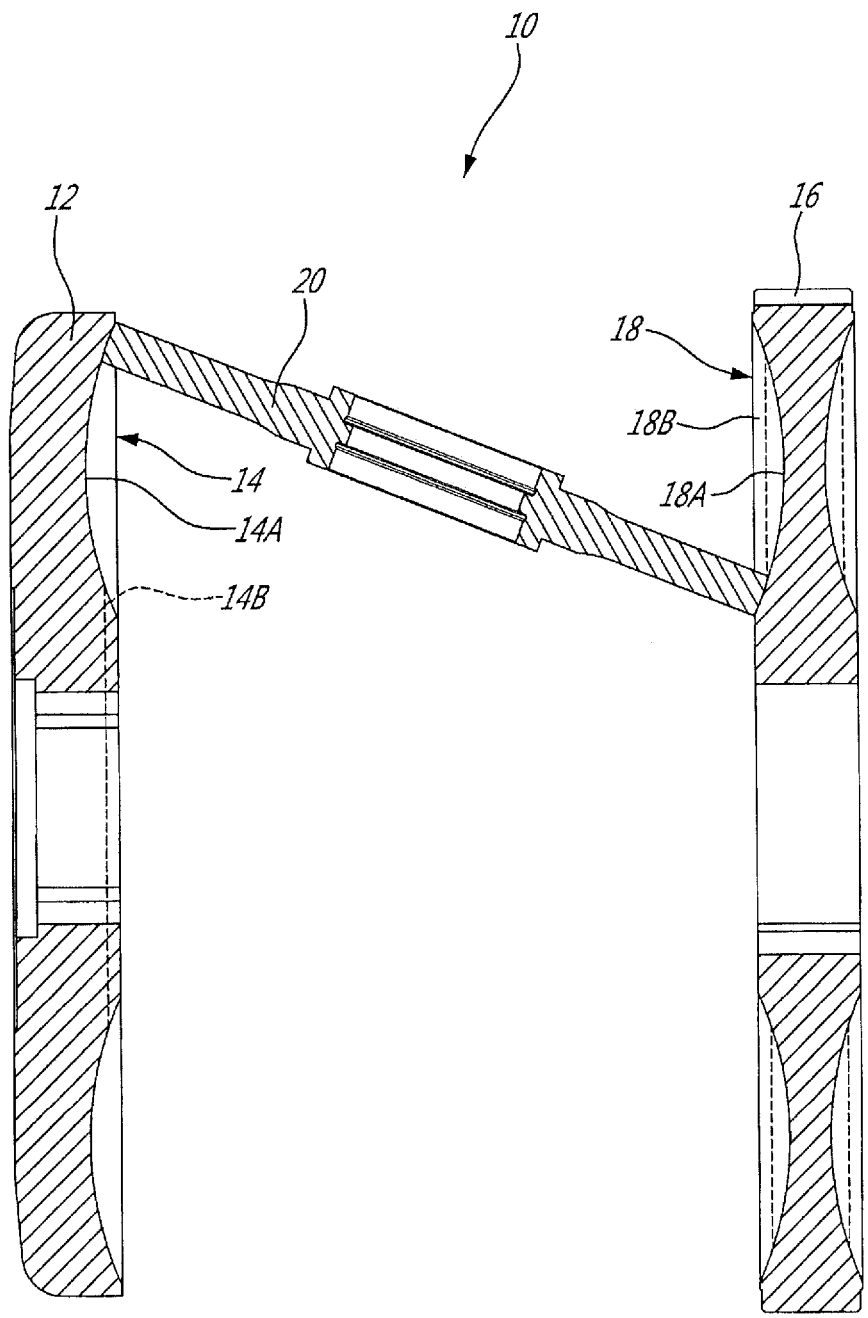
FIG. 2 is a front elevation view of the CVT of FIG. 1 shown in an overdrive position.

FIG. 2 shows the rollers 20 of the CVT 10 in an overdrive position, since the disk 12 is the transmission input and the disk 16 is the transmission output. This overdrive position is a first limit of the working zone of the CVT 10. It is to be noted that the rollers 20 contact the disks 12 and 16 at the limit of the toroidal surfaces 14 and 18.

Figure 3:
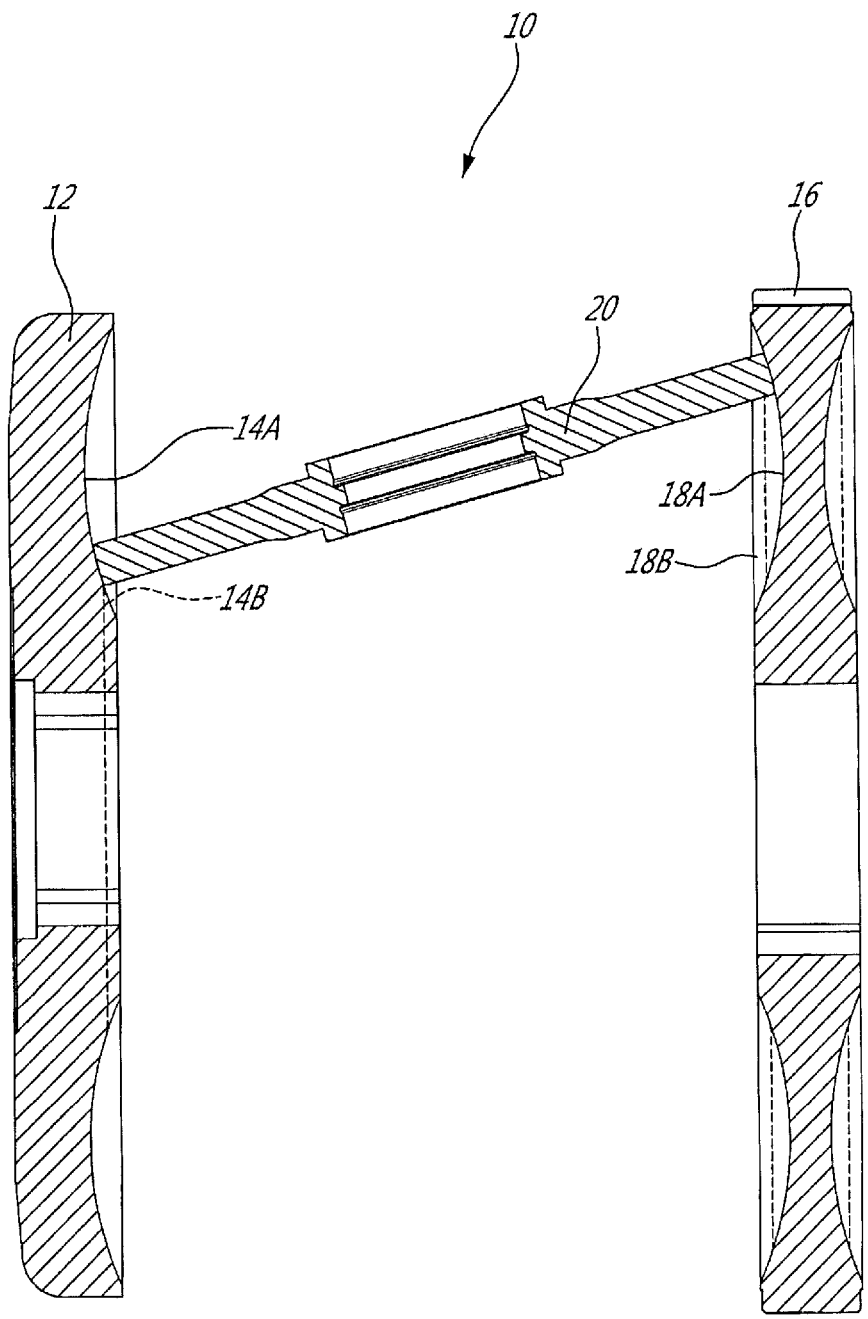
FIG. 3 is a front elevation view of the CVT of FIG. 1 shown in an underdrive position.

Similarly, FIG. 3 shows the rollers 20 of the CVT 10 in an underdrive position, which is a second limit of the working zone of the CVT 10. It is to be noted that the rollers 20 contact the disks 12 and 16 at the limit of the working zones 14A and 18A of the toroidal surfaces 14 and 18.

During the CVT operation, the rollers 20 may be pivoted between the positions illustrated in FIGS. 2 and 3 to provide a desired transmission ratio between the first disk 12 and the second disk 16.

Figure 4:
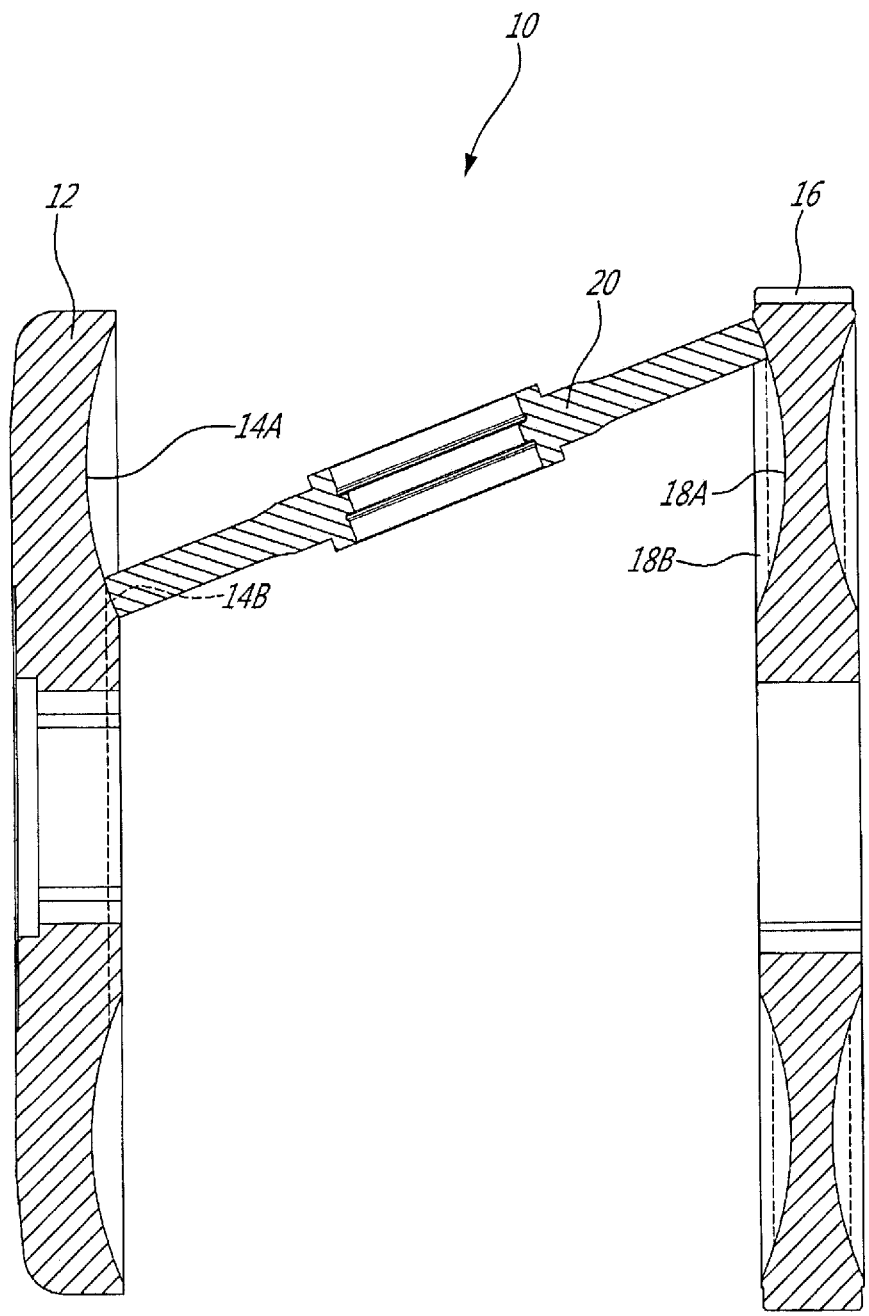
FIG. 4 is a front elevation view of the CVT of FIG. 1 shown in a parked position.

As can be seen from FIG. 4, when the CVT 10 is not operational, the rollers 20 are pivoted so that they are in contact with the parking zones 14B and 18B of the toroidal surfaces 14 and 18. Accordingly, should the CVT be vibrated, for example during transport, maintenance, start-up/shutdown or any other situation when the transmission isn't rotating, the working zones 14A and 18A of the respective toroidal surfaces 14 and 18 remain free of scratches and wear since there is no contact between the rollers 20 and the working zones 14A and 18A.

One skilled in the art will understand that the movements of the rollers are controlled by a controller (not shown) that can act on the rollers via actuators (not shown). The controller generally has inputs that are associated with the prime mover (not shown) to be in a position to know that a shut down or start-up is imminent, for example.

Figure 5:
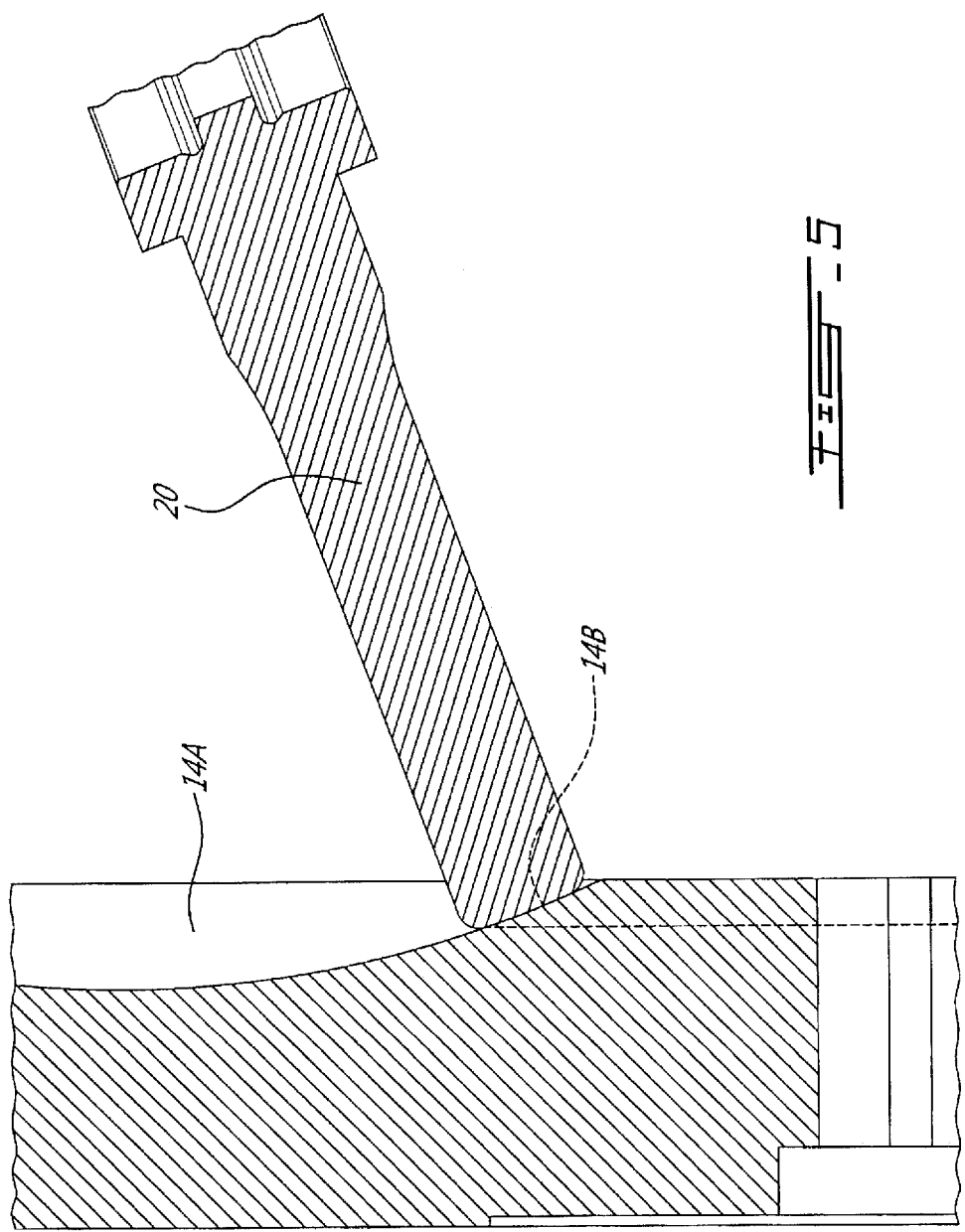
FIG. 5 is a close-up view of a portion of a roller and a portion of a disk when the roller is in the parked position of FIG. 4.

FIG. 5 is a close-up view of the roller 20 in contact with the parking zone 14B of the toroidal surface 14.

Figure 6:
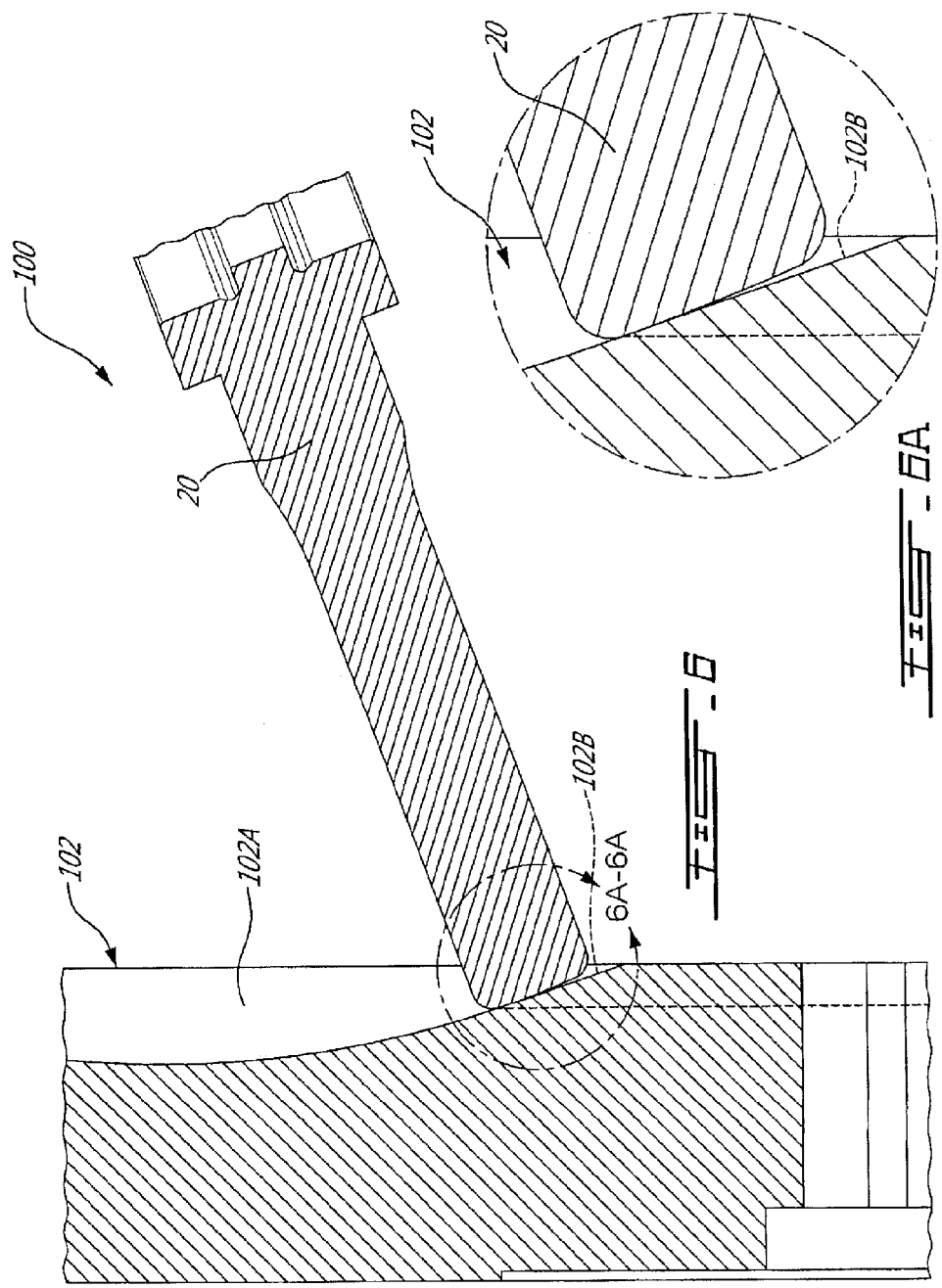

Turning now to FIGS. 6-6A of the appended drawings, which are close-up views similar to FIG. 5, illustrating a portion of a CVT 100 according to a second illustrative embodiment. It is to be noted that since the CVT 100 is very similar to the CVT 10 illustrated in FIGS. 1 to 5 and described hereinabove, only the differences therebetween will be discussed hereinbelow.

Generally stated, the shape of the parking zone 102B is modified with respect to the shape of the parking zone 14B. More specifically, the radius of the parking zone 102B is greater than the radius of the adjacent working zone 102A. The transition between the radiuses of the parking and working zones being seamless.

Accordingly, as can be seen in FIG. 6A, only a portion of the roller 20 contacts the parking zone 102B and the contacting surface of the roller 20 is therefore less likely to be damaged by vibration when it is parked. As a result the scratches and wear is not only controlled to be avoided on the operating surfaces of the disks but also on the surfaces of the rollers 20 since the potential wear and scratches will now occur on the side surface of the roller, a section that isn't used in operation.

Of course, the other disk (not shown) also has this parking zone shape.

Figure 7:
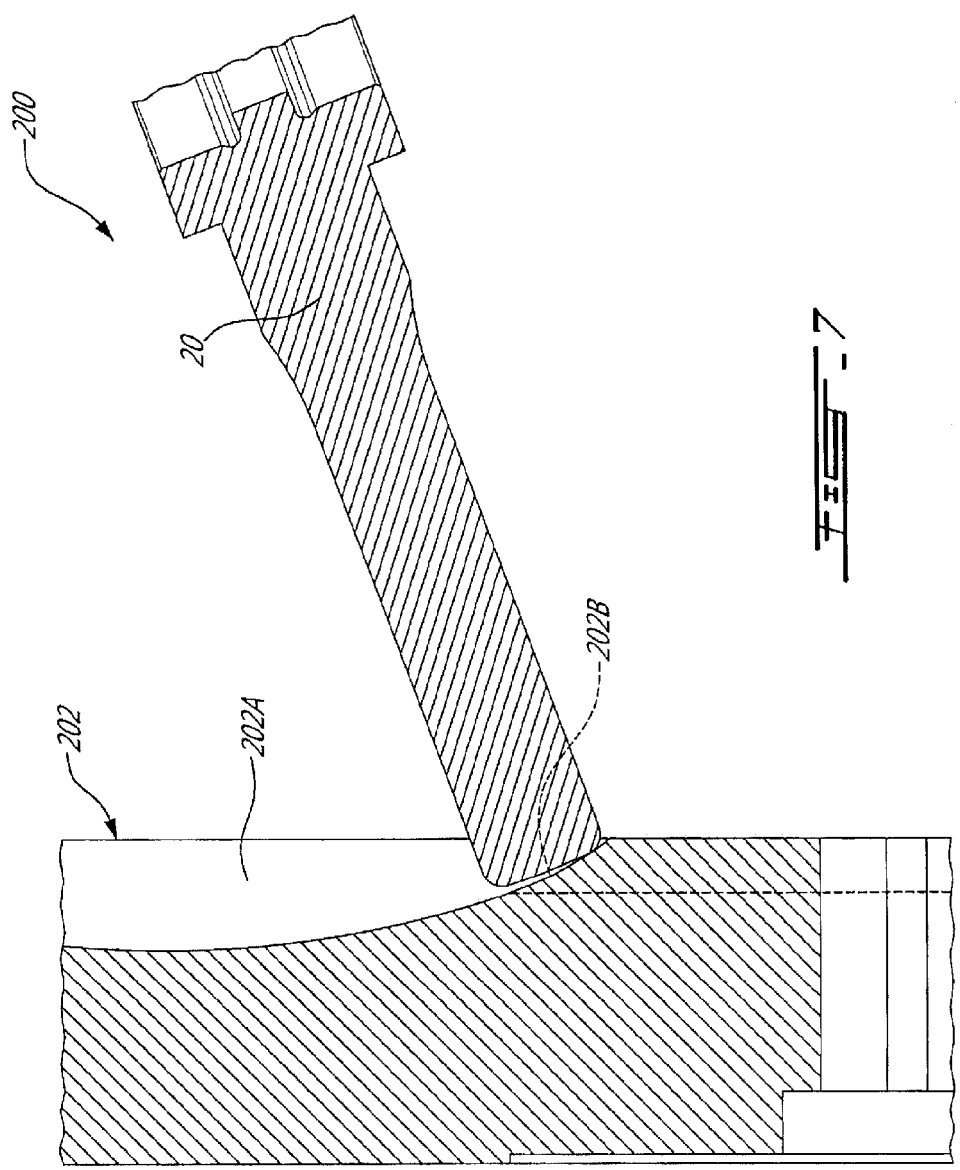
FIG. 7 is a close-up view similar to FIG. 5 but illustrating a portion of a disk according to a third illustrative embodiment.

Turning now to FIG. 7 of the appended drawings, which is a close-up view similar to FIG. 5, illustrating a portion of a CVT 200 according to a third illustrative embodiment. It is to be noted that since the CVT 200 is very similar to the CVT 10 illustrated in FIGS. 1 to 5 and described hereinabove, only the differences therebetween will be discussed hereinbelow.

Generally stated, the shape of the parking zone 202B is modified with respect to the shape of the parking zone 14B. More specifically, the radius of the parking zone 202B is smaller than the radius of the working zone 202A. The transition between the radiuses of the parking and working zones being seamless.

Accordingly, only the portions of the rollers 20 that are not used during operation contact the parking zone 202B therefore no damage can occur on the operational portions of the roller surfaces.

Of course, the other disk (not shown) also has this parking zone shape.

Figure 8:
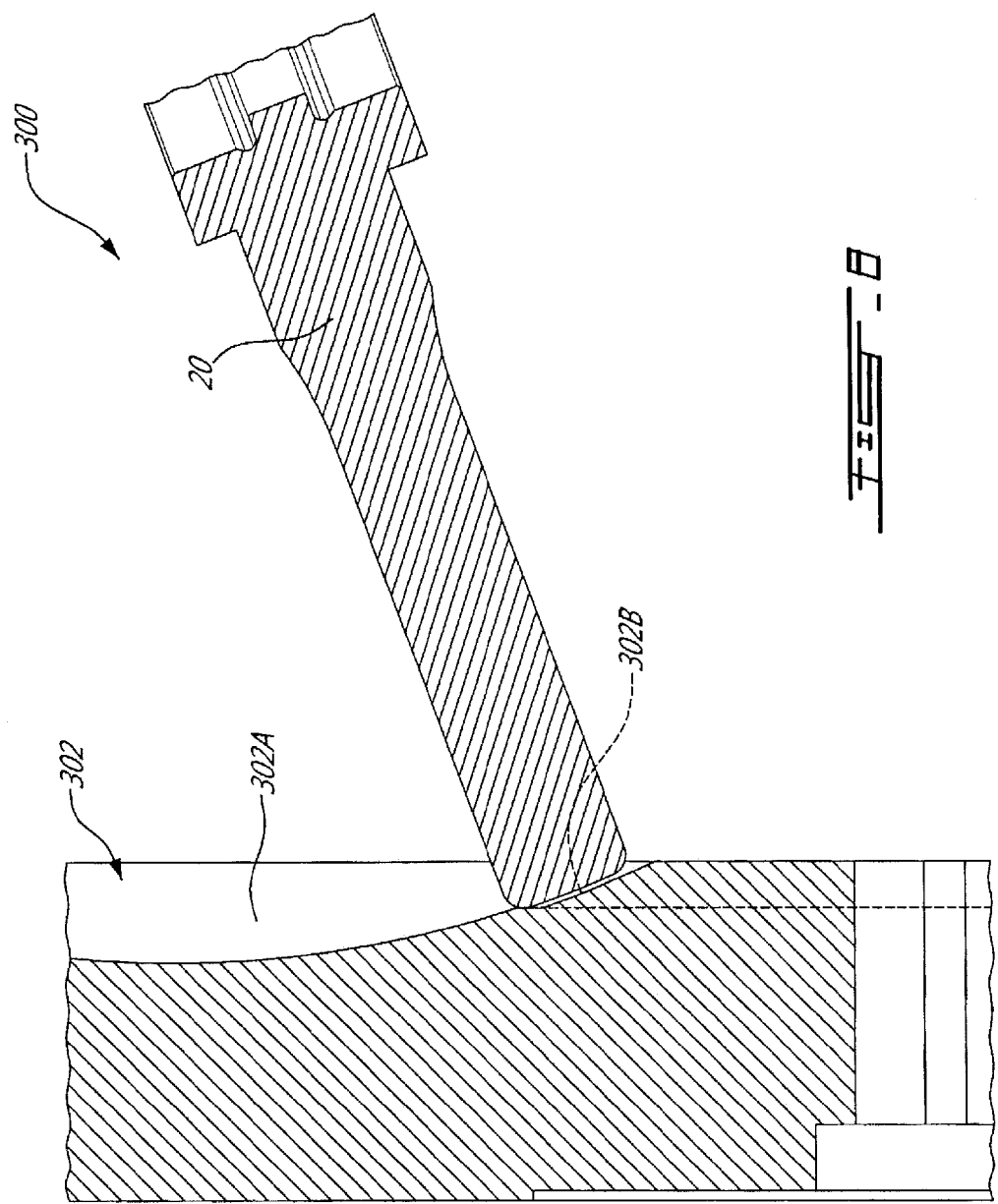
FIG. 8 is a close-up view similar to FIG. 5 but illustrating a portion of a disk according to a fourth illustrative embodiment.

Turning now to FIG. 8 of the appended drawings, which is a close-up view similar to FIG. 5, illustrating a portion of a CVT 300 according to a fourth illustrative embodiment. It is to be noted that since the CVT 300 is very similar to the CVT 10 illustrated in FIGS. 1 to 5 and described hereinabove, only the differences therebetween will be discussed hereinbelow.

Generally stated, the shape of the parking zone 302B is modified with respect to the shape of the parking zone 14B. More specifically, the parking zone 302B has a radial offset with respect to the working zone 302A. Accordingly, only a corner portion of the roller 20 contacts the parking zone 302B. As mentioned above, this protects the roller 20 operating surface from being damaged by vibration when it is parked.

Of course, the other disk (not shown) also has this parking zone shape.

Figure 9:
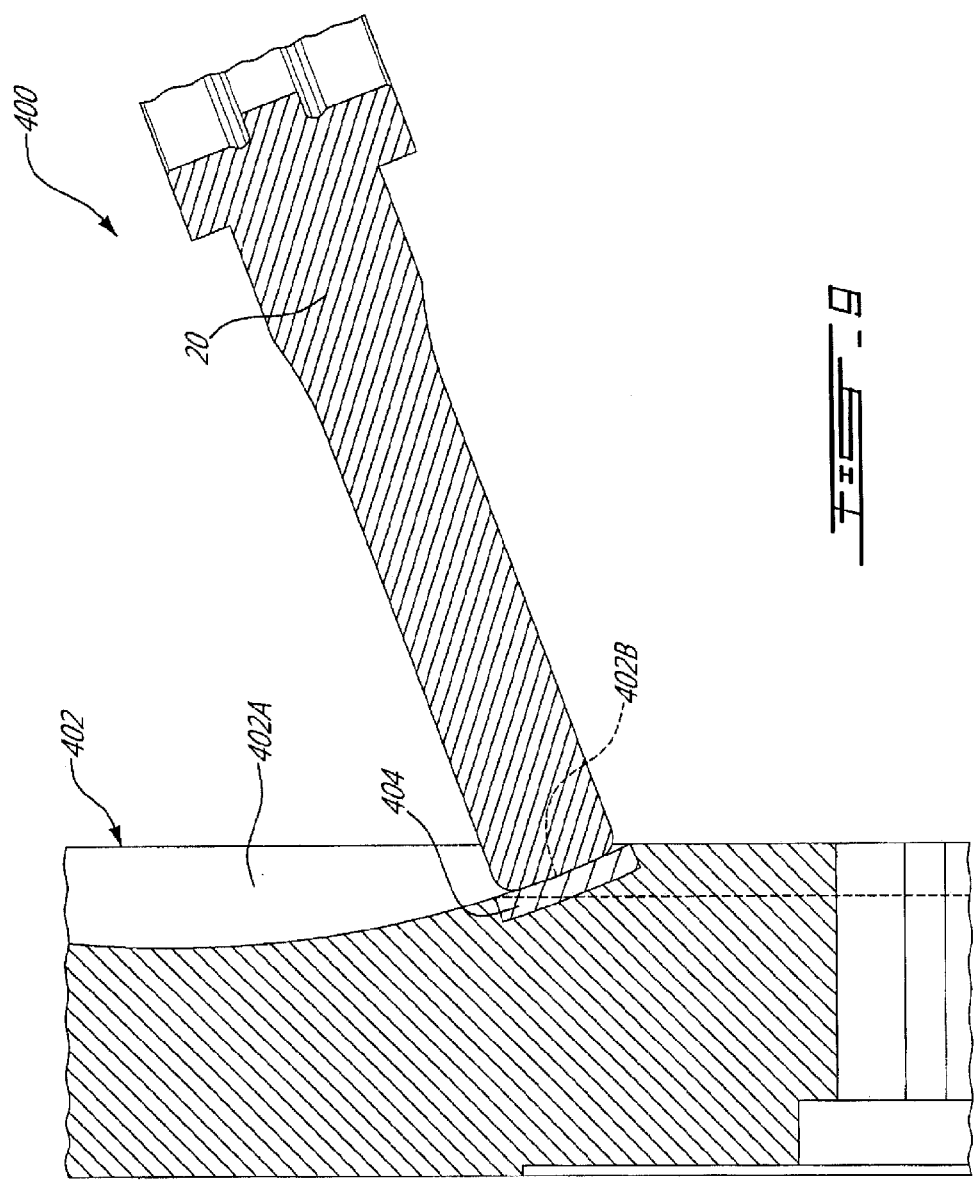
FIG. 9 is a close-up view similar to FIG. 5 but illustrating a portion of a disk according to a fifth illustrative embodiment.

Turning to FIG. 9 of the appended drawings, which is a close-up view similar to FIG. 5, illustrating a portion of a CVT 400 according to a fifth illustrative embodiment. It is to be noted that since the CVT 400 is very similar to the CVT 10 illustrated in FIGS. 1 to 5 and described hereinabove, only the differences therebetween will be discussed hereinbelow.

Generally stated, the contact surface of the parking zone 402B is provided with a softer metal insert 404 onto which the roller 20 is parked. Accordingly, since the metal insert 404 is softer that the metal forming the roller 20, it is less likely that the contact surface of the roller 20 will be damaged by vibration when the roller 20 is parked. The softer material insert, for example brass, could also be replaced by a special coating or any other material (not shown) that can reduce or prevent wear between contacting surfaces. Of course, other types of materials could be made into an insert such as 404.

One skilled in the art will understand that instead of having a softer metal insert 404, the rollers could be made of harder metal so that any vibration occurring when the rollers are in the parking zone causes wear on the disks and not on the rollers. It is believed that a two to four Rockwell C unit (2 to 4 HRC) difference is sufficient between the materials forming the rollers and the disks.

Finally turning to FIG. 10 of the appended drawings, which is a close-up view similar to FIG. 5, illustrating a portion of a CVT 500 according to a sixth illustrative embodiment. It is to be noted that since the CVT 500 is very similar to the CVT 10 illustrated in FIGS. 1 to 5 and described hereinabove, only the differences therebetween will be discussed hereinbelow.

Generally stated, the contact surface of the parking zone 502B is provided with a groove 504 over which the roller 20 is parked. Accordingly, since the working portion of the roller 20 is registered with the groove 504 when parked, it is less likely that the contact surface of the roller 20 will be damaged by vibration.

One skilled in the art will understand that many more elements are required for a toroidal CVT to properly operate. These elements were omitted from the present disclosure and from the appended drawings since they are not concerned with the present invention.

One skilled in the art will understand that while a dual-cavity toroidal CVT was described herein, the basic principles described herein apply to single cavity toroidal CVTs and to half toroidal CVTs.

Of course, one skilled in the art will understand that the rollers are brought in the parking zone while the disks are rotating. Similarly, the rollers are moved out of the parking zones while the disks are rotating. All under the control of the transmission electronic controller (not shown). This is interesting since, at start-up and/or shutdown of a prime mover (not shown), connected to one of the disks 12 and 16, some harmful vibrations may be induced in the transmission by the prime mover. Since the electronic controller may be configured so as to bring and keep the rollers in the parking zones when the prime mover is starting up or shutting down, these induced vibrations are less likely to cause surface deterioration on the rollers and/or disks.

Furthermore, at start-up and/or shutdown, i.e. when the CVT is powered up or powered down, the oil film (not shown) provided on the disks to prevent premature wear thereof, may be insufficient. The electronic controller may thus be configured so as to wait for a predetermined speed to be reached after the prime mover is starting up so that an adequate oil film is present on the disks surfaces before the rollers are brought in contact with the working zones. One skilled in the art should be in a position to determine the predetermined speed according to the CVT parameters.

It is also to be noted that the disk 12 is viewed as an input disk and that the disk 16 is viewed as an output disk. Accordingly, the parking zones are provided near the center of rotation of the disk 12 and near the periphery of the disk 16 so as to park the rollers in an underdrive configuration. Should the disk 12 be an output disk and the disk 16 be an input disk, the position of the parking zones could be reversed. This underdrive parking is interesting since it minimizes the inertia viewed from the prime mover at start-up. Of course, one could decide to design a transmission where the parking zones are in an overdrive position of the rollers or elsewhere if the application requires it.

One skilled in the art will understand that the shape of the rollers 20 and of the toroidal surfaces 14, 18, 102, 202, 302 and 402 have been exaggerated herein for illustration purposes. It is believed that one skilled in the art will be in a position to design rollers and toroidal surfaces according to the above teachings while providing more efficient contact surfaces, for example. It is to be understood that the CVT is not limited in its application to the details of construction and parts illustrated in the accompanying drawings and described hereinabove. The CVT is capable of other embodiments and of being practiced in various ways. It is also to be understood that the phraseology or terminology used herein is for the purpose of description and not limitation. Hence, although the CVT has been described hereinabove by way of illustrative embodiments thereof, it can be modified, without departing from the spirit, scope and nature of the subject invention.

What is claimed is:

1. A continuously variable transmission comprising:
   a first disk provided with a first toroidal surface defining a first working zone and a first parking zone;
   a second disk provided with a second toroidal surface defining a second working zone and a second parking zone; the second toroidal surface facing the first toroidal surface;
   at least one roller in contact with both the first and second toroidal surfaces;
   wherein, a) when the CVT is in operation, the at least one roller is in contact with both the first and second working zones and b) when the CVT is not in operation, the at least one roller is in contact with both the first and second parking zones.

2. A continuously variable transmission as recited in claim 1, wherein the first disk is an input disk and the second disk is an output disk.

3. A continuously variable transmission as recited in claim 2, wherein the input disk has an inner parking zone and an outer working zone; and wherein the output disk has an inner working zone and an outer parking zone.

4. A continuously variable transmission as recited in claim 1, wherein the at least one roller includes three rollers.

5. A continuously variable transmission as recited in claim 1, wherein the parking zones of the first and second disks have surfaces provided with a radius different from the radius of the surfaces of the working zones of the first and second disks.

6. A continuously variable transmission as recited in claim 5, wherein the radius of the parking zones is greater than the radius of the working zones.

7. A continuously variable transmission as recited in claim 5, wherein the transition between the radius of the parking zone and the radius of the working zone is seamless.

8. A continuously variable transmission as recited in claim 1 wherein the parking zones of the first and second disks have surfaces provided with a with a radial offset with respect to the radius of the surfaces of the working zones of the first and second disks.

9. A continuously variable transmission as recited in claim 1, wherein the parking zones of the first and second disks have inserts made of a wear reducing material.

10. A continuously variable transmission as recited in claim 9, wherein the wear reducing material includes brass.

11. A continuously variable transmission as recited in claim 9, wherein the inserts are in the form of a wear reducing coating.

12. A continuously variable transmission as recited in claim 1, wherein the parking zones of the first and second disks have a groove preventing a contact between a portion of the at least one roller and the first and second disks.

13. A continuously variable transmission as recited in claim 1, wherein the hardness of the material forming the roller is from about 2 HRC to about 4 HRC harder than the material forming the first and second parking zones.

14. A method to prevent damages to the working zones of a toroidal CVT, the method comprising:
providing a first disk having a first toroidal surface defining a first working zone and a first parking zone;
providing a second disk having a second toroidal surface defining a second working zone and a second parking zone; the second toroidal surface facing the first toroidal surface;
providing at least one roller in contact with both the first and second toroidal surfaces;
wherein, a) when the CVT is in operation, the at least one roller is maintained in contact with both the first and second working zones and b) when the CVT is not in operation, the at least one roller is maintained contact with both the first and second parking zones.

15. A damage preventing method as recited in claim 14, further comprising bringing the at least one roller in contact with the first and second parking zones when the CVT is powered down.

16. A damage preventing method as recited in claim 14, further comprising bringing the at least one roller in contact with the first and second working zones when the CVT is powered up and has reached a predetermined input speed.

17. A damage prevention method as recited in claim 14, wherein the first disk is an input disk and the second disk is an output disk.

18. A damage prevention method as recited in claim 17, wherein the input disk has an inner parking zone and an outer working zone; and wherein the output disk has an inner working zone and an outer parking zone.

19. A damage prevention method as recited in claim 14, wherein the at least one roller providing step includes providing three rollers.

20. A damage prevention method as recited in claim 14, wherein the parking zones of the first and second disks have surfaces provided with a radius different from the radius of the surfaces of the working zones of the first and second disks.

21. A damage prevention method as recited in claim 20, wherein the radius of the parking zones is greater than the radius of the working zones.

22. A damage prevention method as recited in claim 20, wherein the transition between the radius of the parking zone and the radius of the working zone is seamless.

23. A damage prevention method as recited in claim 20, wherein the parking zones of the first and second disks have surfaces provided with a radial offset with respect to the radius of the surfaces of the working zones of the first and second disks.

24. A damage prevention method as recited in claim 14, wherein the parking zones of the first and second disks have inserts made of a wear reducing material.

25. A damage prevention method as recited in claim 14, wherein the wear reducing material includes brass.

26. A damage prevention method as recited in claim 14, wherein the inserts are in the form of a wear reducing coating.

27. A damage prevention method as recited in claim 14, wherein the parking zones of the first and second disks have a groove preventing a contact between a portion of the at least one roller and the first and second disks.

28. A damage prevention method as recited in claim 14, wherein the hardness of the material forming the roller is from about 2 HRC to about 4 HRC harder than the material forming the first and second parking zones.

* * * * *